(12) United States Patent
Lee

(10) Patent No.: US 11,862,821 B2
(45) Date of Patent: Jan. 2, 2024

(54) BATTERY PACK AND POWER STORAGE DEVICE

(71) Applicant: LG ENERGY SOLUTION, LTD., Seoul (KR)

(72) Inventor: Jin-Kyu Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/771,588

(22) PCT Filed: Jan. 6, 2021

(86) PCT No.: PCT/KR2021/000139
§ 371 (c)(1),
(2) Date: Apr. 25, 2022

(87) PCT Pub. No.: WO2021/194064
PCT Pub. Date: Sep. 30, 2021

(65) Prior Publication Data
US 2022/0367992 A1 Nov. 17, 2022

(30) Foreign Application Priority Data
Mar. 27, 2020 (KR) .......................... 10-2020-0037746

(51) Int. Cl.
*H01M 50/581* (2021.01)
*H01M 10/627* (2014.01)
(Continued)

(52) U.S. Cl.
CPC ....... *H01M 50/581* (2021.01); *H01M 10/627* (2015.04); *H01M 10/658* (2015.04);
(Continued)

(58) Field of Classification Search
CPC ............ H01M 50/211; H01M 50/581; H01M 10/627; H01M 10/658
See application file for complete search history.

(56) References Cited

U.S. PATENT DOCUMENTS 10,514,395 B2 * 12/2019 Fluri ...................... G01R 15/06
2004/0004464 A1    1/2004 Tsukamoto et al.
(Continued)

FOREIGN PATENT DOCUMENTS

JP    2010-231939 A    10/2010
JP    2015-89170 A    5/2015
(Continued)

OTHER PUBLICATIONS

International Search Report (PCT/ISA/210) issued in PCT/KR2021/000139 dated Apr. 22, 2021.
(Continued)

*Primary Examiner* — Karie O'Neill Apicella
(74) *Attorney, Agent, or Firm* — Birch, Stewart, Kolasch & Birch, LLP

(57) ABSTRACT

A battery pack includes a pack case configured to form an appearance, a plurality of battery modules configured to include at least one battery cell; at least one insulation member provided between the plurality of battery modules; and an energy drain unit spaced apart from the insulation member and connected to any one battery module, the energy drain unit being configured to externally short-circuit any one battery module when thermal runaway occurs in at least one battery module.

7 Claims, 8 Drawing Sheets

(51) Int. Cl.
*H01M 10/658* (2014.01)
*H01M 50/211* (2021.01)

(52) U.S. Cl.
CPC .... *H01M 50/211* (2021.01); *H01M 2200/108* (2013.01); *H01M 2220/10* (2013.01)

(56) References Cited

U.S. PATENT DOCUMENTS

| | | |
|---|---|---|
| 2007/0029966 A1 | 2/2007 | Lee et al. |
| 2014/0015488 A1 | 1/2014 | Despesse |
| 2015/0333381 A1 | 11/2015 | Lux et al. |
| 2017/0256760 A1* | 9/2017 | Nietling .............. H01M 50/227 |
| 2018/0034111 A1 | 2/2018 | Hinterberger et al. |
| 2018/0191179 A1 | 7/2018 | Yi et al. |
| 2018/0198101 A1 | 7/2018 | Sheeks et al. |
| 2019/0033390 A1* | 1/2019 | Yamada .................... H02J 7/02 |
| 2019/0046820 A1 | 2/2019 | Lee et al. |
| 2019/0299799 A1 | 10/2019 | Hinterberger et al. |
| 2020/0028145 A1 | 1/2020 | Kano et al. |
| 2020/0028223 A1 | 1/2020 | Berge et al. |

FOREIGN PATENT DOCUMENTS

| | | |
|---|---|---|
| JP | 2017-175705 A | 9/2017 |
| JP | 2019-131654 A | 8/2019 |
| KR | 10-0648704 B1 | 11/2006 |
| KR | 10-2016-0052424 A | 5/2016 |
| KR | 10-2017-0110678 A | 10/2017 |
| KR | 10-2018-0032122 A | 3/2018 |
| KR | 10-2018-0080938 A | 7/2018 |
| KR | 10-2018-0125771 A | 11/2018 |
| KR | 10-2019-0077550 A | 7/2019 |
| KR | 10-2019-0124279 A | 11/2019 |

OTHER PUBLICATIONS

Extended European Search Report for European Application No. 21776999.1, dated Nov. 29, 2022.

* cited by examiner

BATTERY PACK AND POWER STORAGE DEVICE

TECHNICAL FIELD

The present disclosure relates to a battery pack and an energy storage system including the battery rack.

The present application claims priority to Korean Patent Application No. 10-2020-0037746 filed on Mar. 27, 2020 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module including at least one battery cell first, and then configure a battery pack or battery rack by using at least one battery module and adding other components. Here, according to various voltage and capacity requirements, an energy storage system may be configured to include at least one battery pack or battery rack that includes at least one battery module.

In the case of a conventional battery pack, if a fire starts inside a battery module of the battery pack, it is difficult to quickly extinguish the fire. If the fire is not extinguished quickly inside the battery module or the time during which the fire spreads is not delayed, the fire may be transferred to neighboring battery modules faster.

Accordingly, when a fire situation occurs, more rapid and early fire suppression is required, and in particular, a measure to prevent an accident by detecting a danger in advance before a fire occurs is required. For this, it is necessary to suppress the fire and prevent the spread of fire in the unit of a battery module inside the battery pack.

Therefore, it is necessary to find a way for providing a battery pack, which may more rapidly suppress heat propagation or thermal propagation caused by thermal runaway when an abnormal situation occurs at a battery cell, and an energy storage system including the battery pack.

DISCLOSURE

Technical Problem

The present disclosure is designed to solve the problems of the related art, and therefore the present disclosure is directed to providing a battery pack, which may more rapidly suppress heat propagation or thermal propagation caused by thermal runaway when an abnormal situation occurs at a battery cell, and an energy storage system including the battery pack.

Technical Solution

In one aspect of the present disclosure, there is provided a battery pack, comprising: a pack case; a plurality of battery modules provided inside the pack case, each battery module of the plurality of battery modules including at least one battery cell; at least one insulation member provided between the plurality of battery modules; and an energy drainer spaced apart from the at least one insulation member and connected to a first battery module among the plurality of battery modules, the energy drainer being configured to externally short-circuit the first battery module when thermal runaway occurs in at least one battery module among the plurality of battery modules.

The energy drainer may include a relay connected to a battery cell of the first battery module and configured to perform an on/off operation; and a resistor connected to the relay and provided outside the pack case.

The energy drainer may include a drain case provided outside the pack case and configured to accommodate the relay and the resistor.

When thermal runaway occurs in at least one battery module among the plurality of battery modules, the relay may be switched on, and storage energy of at least one battery cell of the first battery module may be converted into heat energy through the resistor.

The resistor may be connected to a cooler outside the energy drainer and be filled with a cooling agent supplied from the cooler.

The resistor may include a supply pipe configured to receive the cooling agent from the cooler; and a discharge pipe spaced apart from the supply pipe and configured to discharge the cooling agent to the cooler.

The resistor unit may be filled with an insulation oil.

The plurality of battery modules may include at least three battery modules so that each battery module of the at least three battery modules includes a plurality of battery cells, and the at least three battery modules may be stacked along a stacking direction of the plurality of battery cells.

The energy drainer may be connected to a battery module disposed at a center among the at least three battery modules.

In another aspect of the present disclosure, there is also provided an energy storage system, which comprises at least one battery pack according to the above embodiments.

Advantageous Effects

According to various embodiments as above, it is possible to provide a battery pack, which may more rapidly suppress heat propagation or thermal propagation caused by thermal runaway when an abnormal situation occurs at a battery cell, and an energy storage system including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
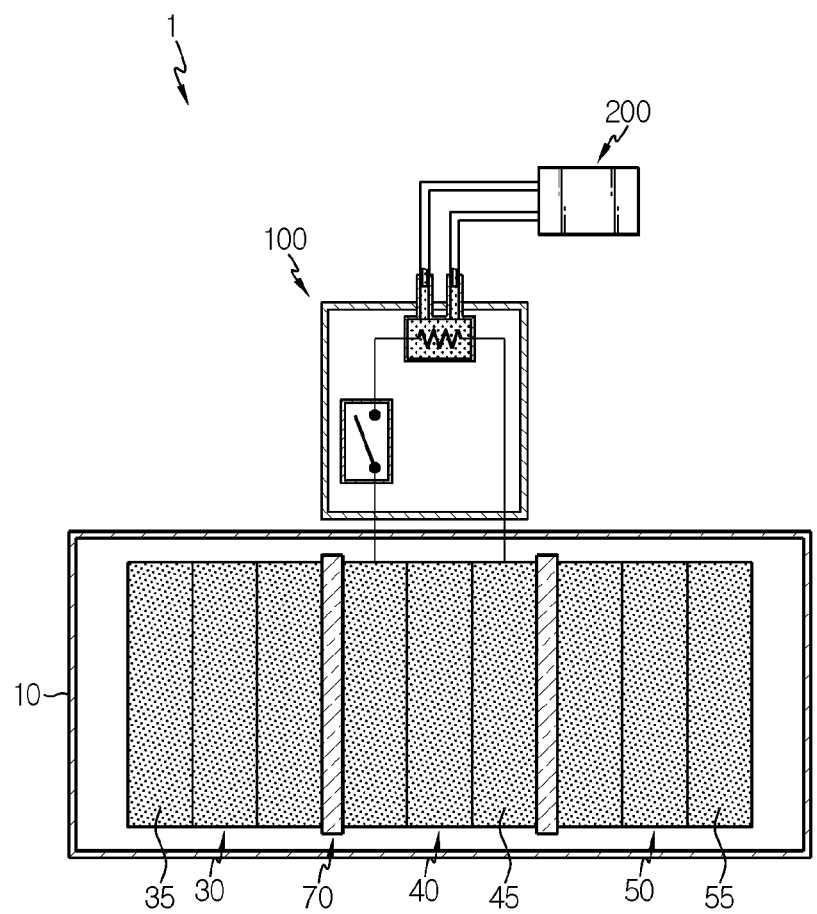
FIG. 1 is a diagram for illustrating a battery pack according to an embodiment of the present disclosure.

FIG. 1 is a diagram for illustrating a battery pack according to an embodiment of the present disclosure.

Referring to FIG. 1, a battery pack 1 serving an energy source may be provided to as an energy storage system, a vehicle, or other devices or instruments. At least one battery pack 1 or a plurality of battery packs 1 may be provided in the energy storage system or the vehicle. Hereinafter, in this embodiment, it will be described that at least one battery pack 1 or a plurality of battery packs 1 are included in the energy storage system.

The battery pack 1 may include a pack case 10, battery modules 30, 40, 50, an insulation member 70, and an energy drain unit 100.

The pack case 10 may form the appearance of the battery pack 1. The pack case 10 may accommodate the battery modules 30, 40, 50 and the insulation member 70, explained later. To this end, the pack case 10 may have an accommodation space capable of accommodating the battery module 30, 40, 50 and the insulation member 70.

The battery modules 30, 40, 50 are provided in the pack case 10 and may include at least one battery cell 35, 45, 55 provided using secondary batteries. The battery modules 30, 40, 50 may be provided in plural.

The plurality of battery modules 30, 40, 50 may include at least three battery modules, and each battery module may include a plurality of battery cells 35, 45, 55. The plurality of battery modules 30, 40, 50 may be stacked on each other along a stacking direction of the plurality of battery cells 35, 45, 55.

The plurality of battery modules 30, 40, 50 may include a first battery module 30, a second battery module 40, and a third battery module 50.

The first battery module 30 may be provided at one side inside the pack case 10. In this embodiment, in the pack case 10, the first battery module 30 may be provided at a left side inside the pack case 10.

The first battery module 30 may include a plurality of battery cells 35.

The plurality of battery cells 35 are secondary batteries and may be provided as at least one of pouch-type secondary batteries, rectangular secondary batteries, and cylindrical secondary batteries. Hereinafter, in this embodiment, it will be described that the plurality of battery cells 35 are pouch-type secondary batteries.

The second battery module 40 is provided inside the pack case 10, and may be disposed between the first battery module 30 and the third battery module 50, explained later. The second battery module 40 may be connected to the energy drain unit 100, explained later.

The second battery module 40 may include a plurality of battery cells 45.

The plurality of battery cells 45 are secondary batteries and may be provided as at least one of pouch-type secondary batteries, rectangular secondary batteries, and cylindrical secondary batteries. Hereinafter, in this embodiment, it will be described that the plurality of battery cells 45 are pouch-type secondary batteries.

The plurality of battery cells 45 may be connected to the energy drain unit 100, explained later. The energy drain unit 100 connected to the plurality of battery cells 45 will be described later in more detail.

The third battery module 50 may be provided at one side inside the pack case 10. In this embodiment, in the pack case 10, the third battery module 50 may be provided at a right side inside the pack case 10. The third battery module 50 may be disposed opposite to the first battery module 30 with the second battery module 40 being interposed therebetween.

The third battery module 50 may include a plurality of battery cells 55.

The plurality of battery cells 55 are secondary batteries and may be provided as at least one of pouch-type secondary batteries, rectangular secondary batteries, and cylindrical secondary batteries. Hereinafter, in this embodiment, it will be described that the plurality of battery cells 55 are pouch-type secondary batteries.

The insulation member 70 may be provided between the plurality of battery modules 30, 40, 50.

Hereinafter, the insulation member 70 according to this embodiment will be examined in more detail.

Figure 2:
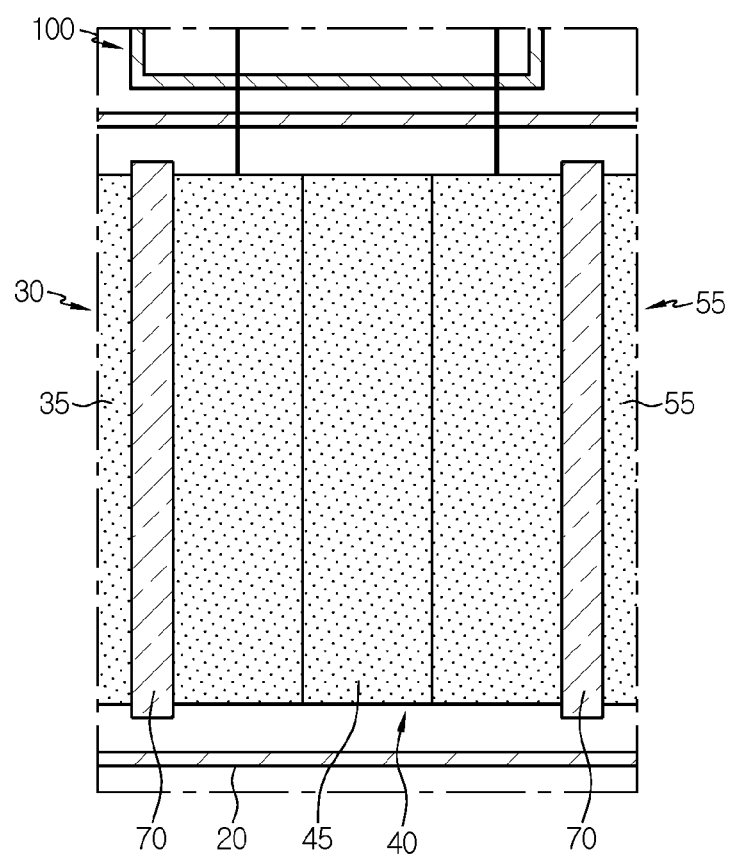
FIG. 2 is a diagram for illustrating an insulation member of FIG. 1.
Figure 3:
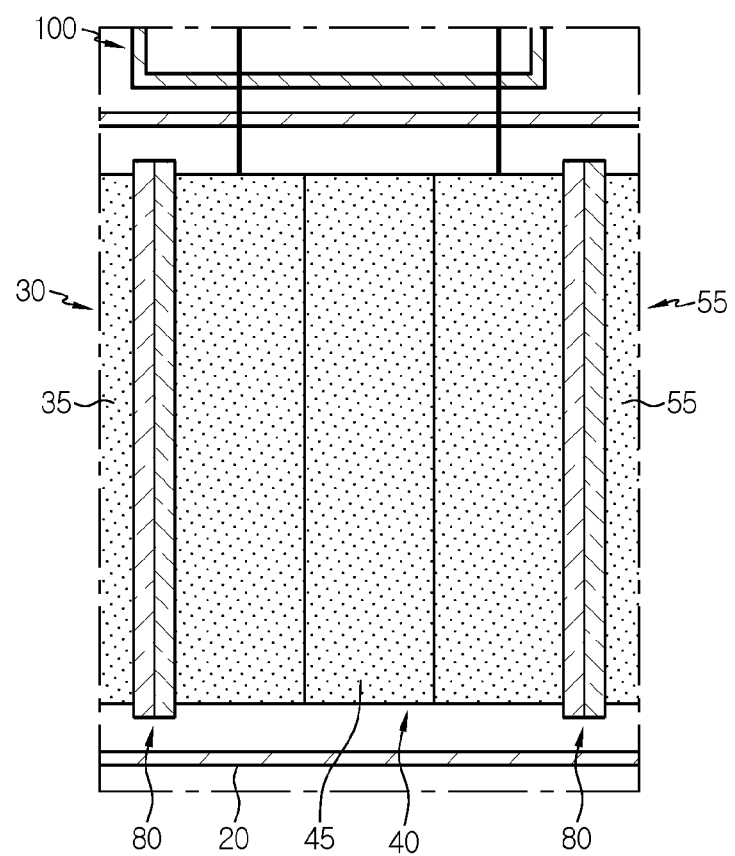
FIG. 3 is a diagram for illustrating another embodiment of the insulation member of FIG. 2.

FIG. 2 is a diagram for illustrating an insulation member of FIG. 1, and FIG. 3 is a diagram for illustrating another embodiment of the insulation member of FIG. 2.

Referring to FIG. 2, the insulation member 70 may be provided in plural so as to be provided between the plurality of battery modules 30, 40, 50, respectively.

The plurality of insulation members 70 may delay thermal propagation to neighboring battery modules when a high temperature occurs due to an abnormal situation in at least one battery module among the plurality of battery modules 30, 40, 50.

To this end, the plurality of insulation members 70 may be made of a material with low thermal conductivity. Referring to FIG. 3, each insulation member 80 may be provided as an assembly of a plurality of insulation layers.

The plurality of insulation members 70, 80 may be provided as a single member or a plurality of interlayer structures capable of delaying thermal propagation to neighboring battery modules 30, 40, 50 as much as possible.

The energy drain unit 100 may be spaced apart from the at least one insulation member 70, be connected to any one battery module 40 among the plurality of battery modules 30, 40, 50, and externally short-circuit the any one battery module 40 among the plurality of battery modules 30, 40, 50 when thermal runaway occurs in at least one battery module 30, 40, 50.

The energy drain unit 100 may be connected to the battery module 40 disposed at the center among the at least three battery modules 30, 40, 50. That is, the energy drain unit 100 may be connected to the second battery module 40 among the first to third battery modules 30, 40, 50.

Hereinafter, the energy drain unit 100 according to this embodiment will be described in more detail.

Figure 4:
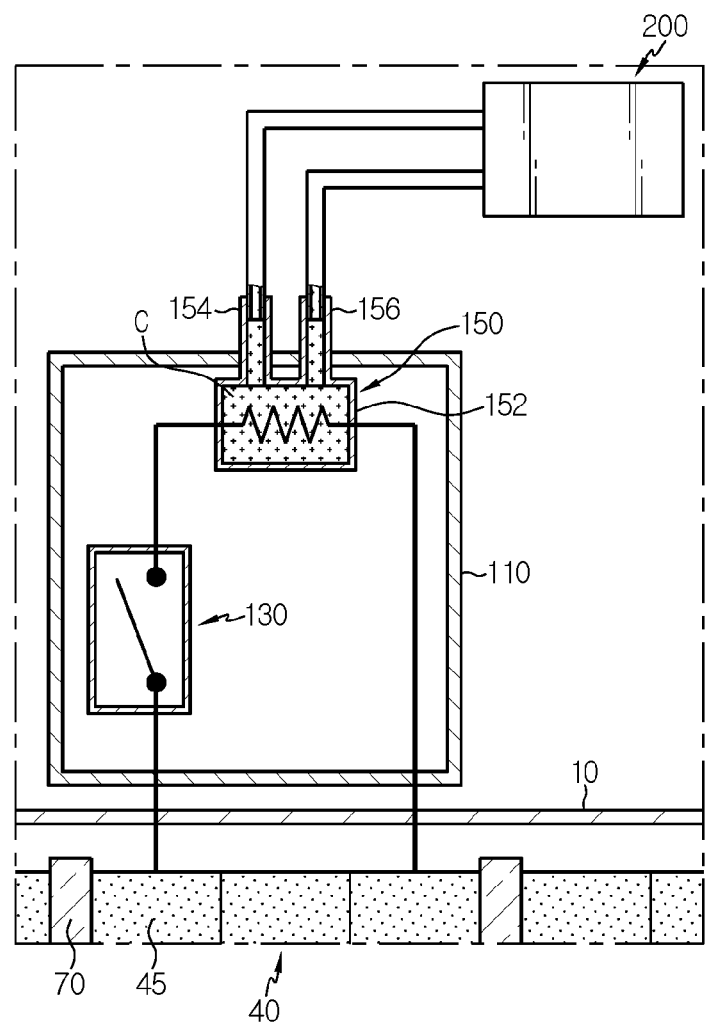
FIG. 4 is a diagram for illustrating an energy drain unit of FIG. 1.

FIG. 4 is a diagram for illustrating an energy drain unit of FIG. 1.

Referring to FIG. 4, the energy drain unit 100 may externally short-circuit a specific battery module 40 when an abnormal situation occurs, in order to more quickly prevent the risk of explosion and the like caused by thermal runaway and resultant heat propagation or thermal propagation when a high temperature occurs due to the abnormal situation at the battery cells 35, 45, 55 of the plurality of battery modules 30, 40, 50.

Specifically, when a thermal runaway situation occurs according to an abnormal situation of any one battery module 30, 40, 50 among the plurality of battery modules 30, 40, 50, the energy drain unit 100 may externally short-circuit a specific battery module 40 in order to effectively prevent thermal propagation to the battery modules 30, 40, 50 adjacent to the battery module 30, 40, 50 at which thermal runaway occurs.

Hereinafter, the energy drain unit 100 according to this embodiment will be described in more detail.

The energy drain unit 100 may include a drain case 110, a relay unit 130, and a resistor unit 150.

The drain case 110 is provided out of the pack case 10 and may accommodate the relay unit 130 and the resistor unit 150. To this end, the drain case 110 may have an accommodation space for accommodating the relay unit 130 and the resistor unit 150. Meanwhile, the drain case 110 may be provided to be detachably attached to the pack case 10.

The relay unit 130 may be provided inside the drain case 110 and may be connected to the any one battery module 40, namely the battery cell 45 of the second battery module 40, to enable an on/off operation. The on-off operation of the relay unit 130 may be provided using an electronic or mechanical structure, and the relay unit 130 may be operated in connection to a control unit or the like or be operated at a predetermined temperature or higher.

The resistor unit 150 is connected to the relay unit 130 and may be provided out of the pack case 10. Specifically, the resistor unit 150 may be provided inside the drain case 110, like the relay unit 130.

The resistor unit 150 may include a resistor material connected to the relay unit 130 and the battery cell 45 of the second battery module 40. Accordingly, when thermal runaway occurs in at least one battery module 30, 40, 50 among the plurality of battery modules 30, 40, 50, the relay unit 130 is switched on, and the storage energy of the at least one battery cell 45 of the any one battery module 40 may be converted into heat energy through the resistor material of the resistor unit 150.

The resistor unit 150 may be connected to a cooling device 200 for cooling the resistor material. Specifically, the resistor unit 150 is connected to the cooling device 200 out of the energy drain unit 100, and the inside of the resistor unit 150 may be filled with a cooling agent C supplied from the cooling device 200. Here, the cooling agent C may be made of an insulating material.

The resistor unit 150 may include a unit body 152, a supply pipe 154, and a discharge pipe 156.

The unit body 152 includes the resistor material, and the cooling agent C may be filled in the unit body 152. The unit body 152 is provided inside the drain case 110, and may be disposed to be spaced apart from the relay unit 130 by a predetermined distance.

The supply pipe 154 is used for receiving the cooling agent C from the cooling device 200, and may be provided at one side of the unit body 152 and be connected to the cooling device 200 to communicate with the cooling device 200. The supply pipe 154 may receive the cooling agent C from the cooling device 200 and guide the cooling agent C into the unit body 152.

The discharge pipe 156 is used for discharging the cooling agent C to the cooling device 200, and may be disposed at one side of the unit body 152 to be spaced apart from the supply pipe 154 by a predetermined distance and be connected to the cooling device 200 to communicate with the cooling device 200. The discharge pipe 156 may guide the cooling agent C inside the unit body 152 to be discharged to the cooling device 200.

Hereinafter, the thermal runaway prevention mechanism through the energy drain unit 100 when an abnormal situation such as thermal runaway occurs in the battery cells 35, 45, 55 of the battery pack 1 according to this embodiment due to overheating or the like will be described in more detail.

Figure 5:
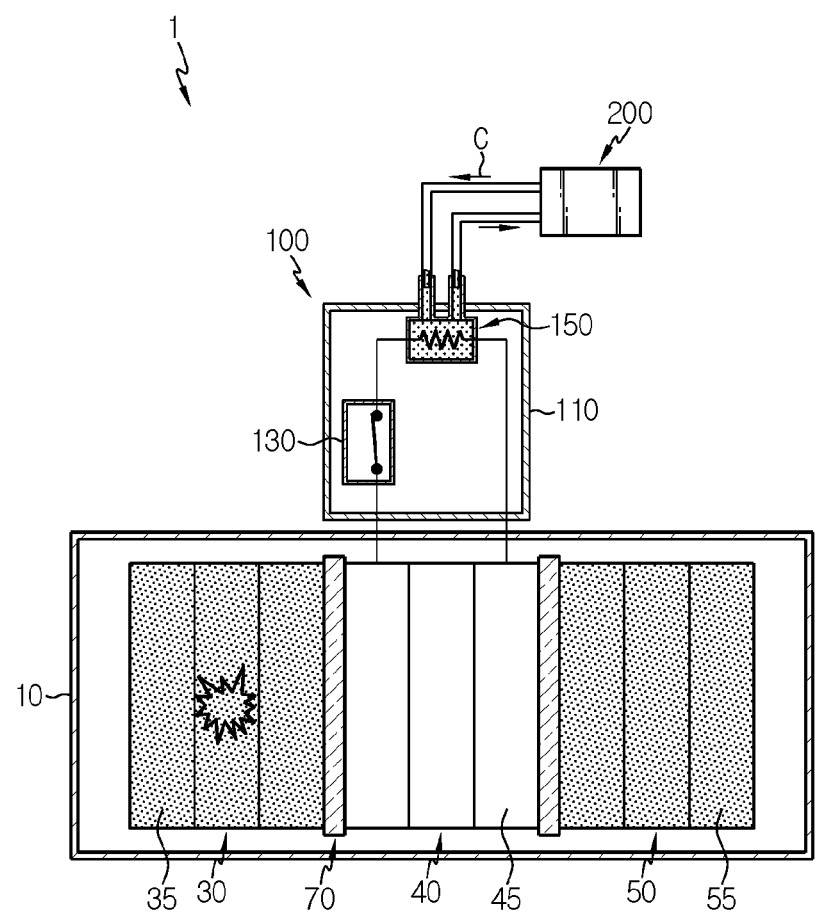
FIGS. 5 and 6 are diagrams for illustrating an operation of the energy drain unit when an abnormal situation at a battery cell of a battery module of the battery pack of FIG. 1.
Figure 6:
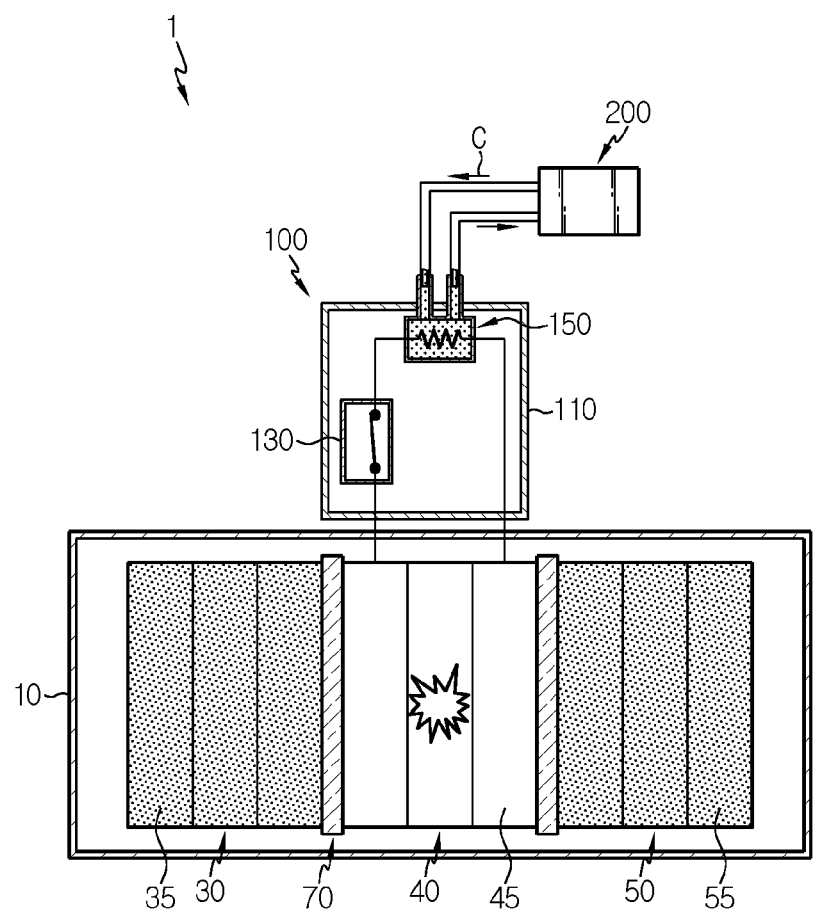

FIGS. 5 and 6 are diagrams for illustrating an operation of the energy drain unit when an abnormal situation at a battery cell of a battery module of the battery pack of FIG. 1.

Referring to FIG. 5, in the battery pack 1, overheating or thermal runaway situation may occur due to an abnormal situation at the battery modules 30, 50, which are not connected to the energy drain unit 100, among the plurality of battery modules 30, 40, 50. For example, an overheating or thermal runaway situation may occur due to an abnormal situation in the battery cell 35 of the first battery module 30 among the first to third battery modules 30, 40, 50.

In this case, the insulation member 70 may preferentially block heat transfer to the neighboring battery module 40. In addition, when the abnormal situation occurs, the energy drain unit 100 may close the switch of the relay unit 130 at a predetermined temperature or higher or through a control unit.

Accordingly, the battery module 40 connected to the energy drain unit 100, namely the battery cells 45 of the second battery module 40, may be externally short-circuited through the energy drain unit 100. Specifically, the storage energy of the battery cells 45 of the second battery module 40 may be converted into heat energy through the resistor unit 150 of the energy drain unit 100.

Here, the energy of the battery cells 40 of the second battery module 40 may be approximately reduced to less than 30% SOC (State Of Charge). Also, as the SOC of the second battery module 40 connected to the energy drain unit 100 decreases, thermal propagation between the battery modules 30, 40, 50 may be more effectively prevented.

Referring to FIG. 6, in the battery pack 1, if an overheating or thermal runaway situation occurs due to an abnormal situation in the battery module 40 connected to the energy drain unit 100, the energy drain unit 100 may close the switch of the relay unit 130 at a predetermined temperature or above or through a control unit when the abnormal situation occurs.

Likewise, the battery cells 45 of the second battery module 40 may be externally short-circuited through the energy drain unit 100. Specifically, the storage energy of the battery cells 45 of the second battery module 40 may be converted into heat energy through the resistor unit 150 of the energy drain unit 100.

Accordingly, it is possible to effectively prevent thermal propagation to the neighboring battery modules 30, 50 by rapidly lowering the level of heat energy that may be transferred from the second battery module 40 to the first battery module 30 or the third battery module 50. At this time, it is also possible to delay heat transfer even through the insulation members 70.

Meanwhile, when the energy drain unit 100 is operated, the supply pipe 154 and the discharge pipe 156 of the resistor unit 150 may guide the cooling agent C to be supplied from the cooling device 200 to the unit body 152 and to be discharged out of the unit body 152, thereby allowing the cooling agent C to be smoothly circulated inside the unit body 152. Accordingly, the resistor unit 150 may effectively convert the storage energy of the battery cells 45 into heat energy while maintaining safety better.

Figure 7:
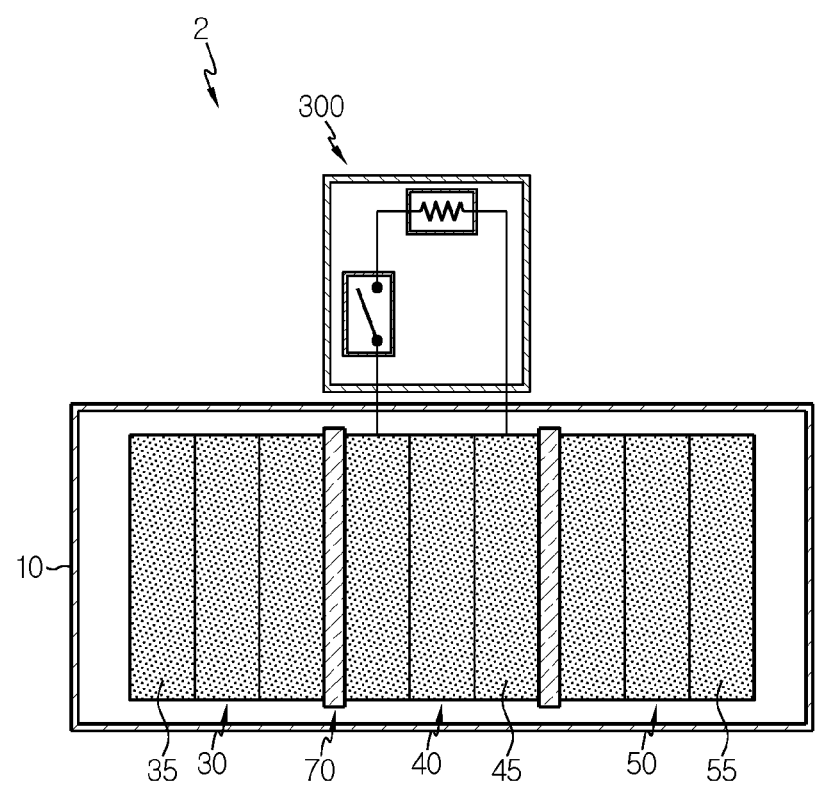
FIG. 7 is a diagram for illustrating a battery pack according to another embodiment of the present disclosure.
Figure 8:
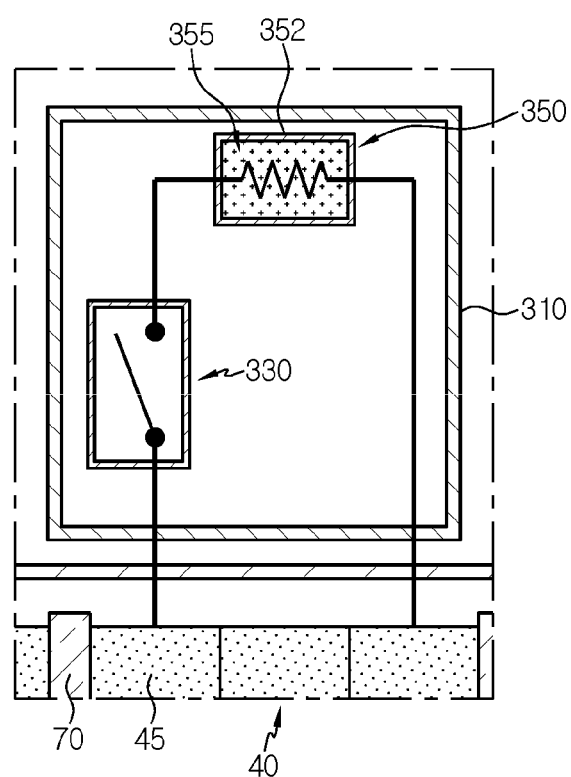
FIG. 8 is a diagram for illustrating an energy drain unit of FIG. 7.

FIG. 7 is a diagram for illustrating a battery pack according to another embodiment of the present disclosure, and FIG. 8 is a diagram for illustrating an energy drain unit of FIG. 7.

Since a battery pack 2 according to this embodiment is similar to the battery pack 1 of the former embodiment, features substantially identical or similar to the former embodiment will not be described again, and features different from the former embodiment will be described in detail.

Referring to FIGS. 7 and 8, a battery pack 2 may include the pack case 10, the battery module 30, 40, 50, the insulation member 70, and an energy drain unit 300.

The pack case 10, the battery module 30, 40, 50, and the insulation member 70 are substantially identical or similar to those of the former embodiment, and thus will not be described in detail again.

The energy drain unit 300 may include a drain case 310, a relay unit 330 and a resistor unit 350.

The drain case 310 and the relay unit 330 are substantially identical or similar to the drain case 110 and the relay unit 130 of the former embodiment, and thus will not be described in detail again.

The resistor unit 350 includes a resistor material and may be filled with an insulation oil 355 therein. The insulation oil 355 may cool the resistor material inside the resistor unit 350.

In the battery pack 2 according to this embodiment, since the insulation oil 355 is filled in the resistor unit 350 of the energy drain unit 300, the resistor unit 350 may be cooled more conveniently without additionally connecting a separate cooling device 200.

According to various embodiments as above, it is possible to provide a battery pack 1, 2, which may more rapidly suppress heat propagation or thermal propagation caused by thermal runaway when an abnormal situation occurs at the battery cell 35, 45, 55 of the plurality of battery modules 30, 40, 50, and an energy storage system including the battery pack 1, 2.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery pack, comprising:
a pack case;
a plurality of battery modules provided inside the pack case, each battery module of the plurality of battery modules including at least one battery cell;
at least one insulation member provided between the plurality of battery modules; and
an energy drainer spaced apart from the at least one insulation member and connected to a first battery module among the plurality of battery modules, the energy drainer being configured to externally short-circuit the first battery module when thermal runaway occurs in at least one battery module among the plurality of battery modules,
wherein the energy drainer includes:
a relay connected to a battery cell of the first battery module and configured to perform an on/off operation; and
a resistor connected to the relay and provided outside the pack case,
wherein the resistor is connected to a cooler outside the energy drainer and is filled with a cooling agent supplied from the cooler.

2. The battery pack according to claim 1, wherein the energy drainer includes a drain case provided outside the pack case and configured to accommodate the relay and the resistor.

3. The battery pack according to claim 1, wherein when thermal runaway occurs in at least one battery module among the plurality of battery modules, the relay is switched on, and storage energy of at least one battery cell of the first battery module is converted into heat energy through the resistor.

4. The battery pack according to claim 1, wherein the resistor includes:
a supply pipe configured to receive the cooling agent from the cooler; and
a discharge pipe spaced apart from the supply pipe and configured to discharge the cooling agent to the cooler.

5. The battery pack according to claim 1, wherein the plurality of battery modules include at least three battery modules so that each battery module of the at least three battery modules includes a plurality of battery cells, and
wherein the at least three battery modules are stacked along a stacking direction of the plurality of battery cells.

6. The battery pack according to claim 5, wherein the energy drainer is connected to a battery module disposed at a center among the at least three battery modules.

7. An energy storage system, comprising:
at least one battery pack as defined in claim 1.

* * * * *